UNITED STATES PATENT OFFICE.

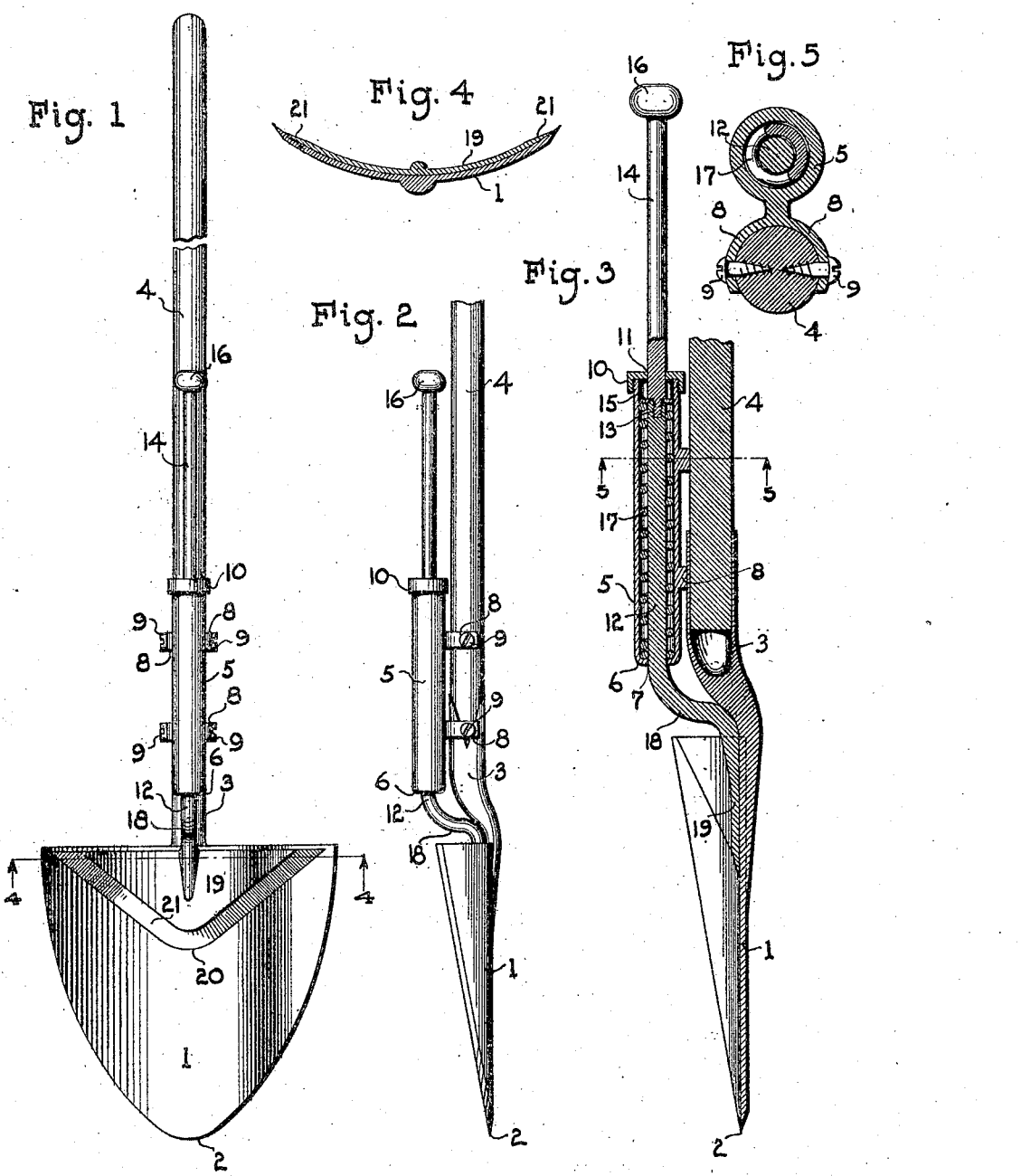

AUGUSTUS MUTHART ROAT, OF WILLIAMSPORT, PENNSYLVANIA.

SHOVEL CLEANER.

1,419,987. Specification of Letters Patent. Patented June 20, 1922.

Application filed August 13, 1921. Serial No. 492,173.

*To all whom it may concern:*

Be it known that I, AUGUSTUS M. ROAT, a citizen of the United States, residing at Williamsport, in the county of Lycoming and State of Pennsylvania, have invented a new and useful Shovel Cleaner, of which the following is a specification.

This invention relates to shovel cleaners.

The object is to provide a simple, cheaply manufactured and easily applied device for attachment to a spade or shovel, to be permanently carried thereby for the purpose of cleaning or scraping the blade of the shovel when desired.

Another object is to provide a device of this character capable of being mounted on the handle of the spade or shovel above the said blade in an out-of-the-way position so as to permit of the free use of the same in the operation of shoveling or spading, and yet be readily reached by the foot of the operator to cause a scraping or cleaning blade to transverse the shovel in a longitudinal direction to effectually remove all adhering matter.

A further object is to provide means for automatically returning the scraping blade to its normal position at the top of the shovel after the foot is removed from the device and the shovel has been scraped, to permit of the continued use of the same in the ordinary manner.

A full and complete understanding of the invention may be obtained from a consideration of the following detailed description, taken in connection with the accompanying drawing forming a part of this specification; it being understood that while the drawing shows a practical form of the invention, the latter is not confined to strict conformity therewith, but may be changed or modified, so long as such changes or modifications mark no material departure from the salient features of the invention, as specifically pointed out in the appended claims.

In the drawings, in which similar reference characters designate corresponding parts throughout the several figures:—

Figure 1 is a front elevation of a shovel of a well-known type and having the improved cleaner applied thereto.

Figure 2 is a side elevation of the same, the upper part of the handle being omitted.

Figure 3 is a vertical, longitudinal section through the shovel and cleaner, drawn to a somewhat larger scale.

Figure 4 is a transverse sectional view, taken on the line 4—4 of Figure 1.

Figure 5 is a detail transverse section taken on the line 5—5 of Figure 3.

In the drawing there is illustrated an ordinary post-hole shovel having the usual triangular shaped blade 1 formed straight across the top and having its side edges curved and directed towards a central, rounded point 2, the rear side of the said blade being beveled to provide the usual cutting edge along the sides and point. At the rear the blade is provided with an integral socket 3, welded to or otherwise joined to the back of the blade at the top thereof, and extending considerably above the same for the reception of the usual wooden handle 4, all of which is of an old and well-known construction and forms no part of the present invention, the improved device being equally adapted for application to other forms of shovels or spades.

The invention comprises a tubular barrel or cylinder 5 formed of suitable metal of a length somewhat greater than two-thirds the length of the shovel blade 1, and of a diameter substantially equal to or less than the diameter of the shovel handle 4. This barrel has its lower end closed, as at 6, and provided with a central aperture 7, and a pair of spaced clips 8 formed of strips of metal which are welded, riveted or otherwise secured to the barrel in spaced relation to each end of the latter. The clips have suitable perforations adjacent to their ends, for the reception of ordinary wood screws 9 which traverse the same and enter the sides of the wooden handle 4, for the purpose of rigidly mounting the barrel upon the handle, with the lower end thereof elevated somewhat above the upper straight edge of the shovel blade and, as viewed in Figures 2 and 3, somewhat in advance of the longitudinal center line of the said blade.

The upper end of the barrel 5 is open, and is provided with external screw-threads for the reception of a cap 10, which is applied thereto and is provided with a central aperture 11 in alinement with the aperture 7 at the lower end of the barrel.

A plunger rod 12 formed of some suitable stout metal of a diameter somewhat less than the internal diameter of the barrel is adapted to freely slide through the lower aperture 7 formed at the bottom of the barrel, and said rod terminates short of the top of the said barrel where it is provided with a screw-threaded socket 13. Another length of rod 14 traverses the aperture 11 formed in the cap of the barrel, and has its lower end reduced and threaded and adapted to be screwed into the socket 13 of the lower plunger rod 12, the diameters of the two rods being the same and forming in effect a continuous plunger.

A washer 15 is located between the upper end of the rod 12 and the lower end of the rod 14, the threaded engagement between the two rods serving to maintain the washer in place and causing the same to travel upwardly and downwardly within the barrel, when the plunger is actuated in a downward direction by the pressure of the foot of the operator which is placed upon a ball or knob 16 formed at the top of the section 14 of the plunger, and when the latter is forced upwardly, upon release by the foot, through the expansive force of a coiled spring 17, in surrounding relation to the section 12 of the plunger, and having its upper and lower ends bearing against the washer 15 and closed end 6 of the barrel, respectively.

At the lower end, the rod 12, where emerging from the lower end of the barrel, is inwardly directed, as at 18, and is there welded to or otherwise connected to a scraper blade 19 triangular in shape and formed of thin, hardened metal and having its top edge straight and parallel with the top edge of the shovel and normally on a substantial level therewith, when the spring 17 is holding the same in elevated position, the lower inclined edges of the scraper blade being beveled to a cutting edge, as indicated at 21, to facilitate its entrance beneath the clay or soil adhering to the blade of the shovel, it being understood that the blade 19 is curved to conform to the contour of the shovel blade throughout its length so as to closely hug the same when the plunger is depressed and when the scraper is being elevated by the spring.

The shovel is to be used in the ordinary manner, either for shoveling dirt from the surface, in spading the ground or in digging holes, and when the blade thereof becomes clogged or loaded with dirt or clay, as usually happens, especially if the soil is wet, it is not necessary to lose time by scraping the shovel blade with a piece of wood or some other article, but the hands of the shoveler may remain in grasping relation to the handle of the shovel and by simply pressing downwardly upon the knob 16 with one foot, the scraper blade 19 is caused to travel longitudinally of the shovel blade 1, throughout its length, when all dirt adhering thereto is removed and the spring within the barrel immediately return the said scraper to the upper end of the shovel, when the shoveling process may be proceeded with.

From the foregoing it will be seen that a simple, cheaply manufactured and strong and durable device has been provided for the cleaning of shovels, spades and the like, which may be easily applied in position and which relieves the hands of the operator to clean the shovel, the operation consisting merely of the single movement of the foot to depress the plunger.

What is claimed is :—

1. A shovel scraper comprising a tubular casing or barrel having means for attachment to the handle of a shovel above the shovel blade, a plunger rod projecting above and below the ends of the barrel, the lower end of the plunger rod being turned inwardly toward the shovel blade, a transversely disposed scraper blade carried thereby, said scraper being curved transversely to fit the shovel and extending from side to side thereof at the top, a shoulder carried by the plunger within the barrel, and a coiled spring surrounding the plunger between the said shoulder and the end of the barrel, whereby, when the said plunger is forced downwardly and the scraper is caused to traverse the shovel blade longitudinally, the same will be automatically returned upwardly by the spring.

2. A shovel scraper comprising a tubular casing or barrel having means for attachment to the handle of a shovel above and in front of the shovel blade, a plunger rod projecting above and below the ends of the barrel and having a knob at the upper end, the lower end of the plunger rod being turned inwardly toward the shovel blade, a transversely disposed scraper blade carried thereby, said scraper being curved transversely to fit the shovel and extending from side to side thereof, at the top, a shoulder carried by the plunger within the barrel and near the top of the latter, and a coiled spring surrounding the plunger between the said shoulder and the lower end of the barrel, whereby when the said knob is forced downwardly and the scraper is caused to traverse the shovel blade longitudinally, the same will be automatically returned upwardly by the spring.

3. A scraper for shovels, spades and the like comprising a transversely-disposed blade shaped transversely to fit the blade of the shovel or spade, and normally occupying a position at the top thereof in close contact therewith, said blade being triangular in shape and having its lower edge beveled, a plunger connected to the blade and mounted on the handle, and a spring for raising the blade to its normal position.

In testimony that I claim the foregoing as my own, I have hereto affixed my signature.

AUGUSTUS MUTHART ROAT.